(12) United States Patent
Knebel et al.

(10) Patent No.: US 7,087,891 B2
(45) Date of Patent: Aug. 8, 2006

(54) SCANNING MICROSCOPE HAVING AN ACOUSTOOPTICAL COMPONENT

(75) Inventors: Werner Knebel, Kronau (DE); Rafael Storz, Heidelberg (DE); Kyra Moellmann, Trippstadt (DE)

(73) Assignee: Leica Mircosystems Heidelberg GmbH, Mannheim (DE)

( * ) Notice: Subject to any disclaimer, the term of this patent is extended or adjusted under 35 U.S.C. 154(b) by 151 days.

(21) Appl. No.: 10/762,602

(22) Filed: Jan. 22, 2004

(65) Prior Publication Data

US 2004/0169134 A1     Sep. 2, 2004

(30) Foreign Application Priority Data

Jan. 22, 2003   (DE) ............................... 103 02 259

(51) Int. Cl.
*H01J 3/14*   (2006.01)
*H01J 5/16*   (2006.01)
*H01J 40/14*  (2006.01)
*G02F 1/33*   (2006.01)

(52) U.S. Cl. ...................................... 250/234; 359/305
(58) Field of Classification Search ............. 250/201.3, 250/203.1, 204, 205, 234–236; 359/305, 359/307
See application file for complete search history.

(56) References Cited

U.S. PATENT DOCUMENTS

2002/0003204 A1     1/2002   Engelhardt ................... 250/216

FOREIGN PATENT DOCUMENTS

| DE | 19702753 | 7/1998 |
| DE | 19713254 | 10/1998 |
| DE | 19906757 | 12/1999 |
| DE | 10033269 | 1/2002 |
| EP | 0495930 | 4/1999 |

OTHER PUBLICATIONS

J. Brakenhoff, "Imaging Modes in Confocal Scanning Light Microscopy (CSLM)", Journal of Microscopy, vol. 117, Pt 2, Nov. 1979, pp. 233-242.

*Primary Examiner*—Stephone B. Allen
*Assistant Examiner*—Suezu Ellis
(74) *Attorney, Agent, or Firm*—Darby & Darby

(57) ABSTRACT

A scanning microscope having an acoustooptical component that splits out illuminating light for illumination of a sample from the output light of at least one light source, and conveys detected light proceeding from the sample to a detector, comprises, in the beam path of the output light from which the illuminating light is split out, at least one monitoring detector which is the measuring element of a control circuit. The scanning microscope is characterized in that fluctuations over time in the illuminating light power level are largely eliminated.

12 Claims, 2 Drawing Sheets

250 # SCANNING MICROSCOPE HAVING AN ACOUSTOOPTICAL COMPONENT

CROSS REFERENCE TO RELATED APPLICATIONS

This application claims priority to German patent application 103 02 259.7, the subject matter of which is hereby incorporated by reference herein.

FIELD OF THE INVENTION

The invention concerns a scanning microscope having an acoustooptical component that splits out illuminating light for illumination of a sample from the output light of at least one light source, and conveys detected light proceeding from the sample to a detector.

BACKGROUND OF THE INVENTION

In scanning microscopy, a sample is illuminated with a light beam in order to observe the reflected or fluorescent light emitted from the sample. The focus of an illuminating light beam is moved in an object plane by means of a controllable beam deflection device, generally by tilting two mirrors, the deflection axes usually being perpendicular to one another so that one mirror deflects in the X direction and the other in the Y direction. Tilting of the mirrors is brought about, for example, by means of galvanometer positioning elements. The power level of the light coming from the specimen is measured as a function of the position of the scanning beam. The positioning elements are usually equipped with sensors to ascertain the present mirror position.

In confocal scanning microscopy specifically, a specimen is scanned in three dimensions with the focus of a light beam. A confocal scanning microscope generally comprises a light source, a focusing optical system with which the light of the source is focused onto an aperture (called the "excitation pinhole"), a beam splitter, a beam deflection device for beam control, a microscope optical system, a detection pinhole, and the detectors for detecting the detected or fluorescent light. The illuminating light is coupled in, for example, via a beam splitter. The fluorescent or reflected light coming from the specimen travels back through the beam deflection device to the beam splitter, passes through it, and is then focused onto the detection pinhole behind which the detectors are located. Detected light that does not derive directly from the focus region takes a different light path and does not pass through the detection pinhole, so that a point datum is obtained which results, by sequential scanning of the specimen, in a three-dimensional image.

In order to couple the excitation light of at least one light source into the microscope and to block out, from the light coming via the detection beam path from the specimen, the excitation light or excitation wavelength scattered and reflected at the specimen, it is also possible to use, instead of the beam splitter, an optical arrangement embodied as an acoustooptical component, for example as known from German Unexamined Application DE 199 06 757 A1.

A three-dimensional image is usually achieved by acquiring image data in layers, the path of the scanning light beam on or in the specimen ideally describing a meander (scanning one line in the X direction at a constant Y position, then stopping the X scan and slewing by Y displacement to the next line to be scanned, then scanning that line in the negative X direction at constant Y position, etc.). To make possible acquisition of image data in layers, the sample stage or the objective is shifted after a layer is scanned, and the next layer to be scanned is thus brought into the focal plane of the objective.

In many applications samples are prepared with several markers, for example several different fluorescent dyes. These dyes can be excited sequentially, for example using illuminating light beams that comprise different excitation wavelengths. Simultaneous excitation using an illuminating light beam that contains light of several excitation wavelengths is also usual. An arrangement having a single laser emitting several laser lines is known, for example, from European Patent Application EP 0 495 930, "Confocal microscope system for multi-color fluorescence.". In practical use at present, such lasers are usually embodied as mixed-gas lasers, in particular as ArKr lasers.

The light power level of the illuminating light is subject to fluctuations over time as a result of various effects, with negative repercussions in the context of sample examination.

One known method of compensating for short-term fluctuations in, for example, the illuminating light power level is based on dividing out a reference beam from the illuminating beam using a beam splitter, and using the ratio of the measured power levels of the reference and detected beams for image generation and calculation so that instantaneous power level fluctuations are thus eliminated. This is disclosed in G. J. Brakenhoff, Journal of Microscopy, Vol. 117, Pt. 2, November 1979, pp. 233–242. This method has certain disadvantages. For example, calculating out the laser power level fluctuations retrospectively upon image calculation is complex, and is not always an entirely satisfactory correction method. When a ratio is calculated from the measured power levels of the reference and detected light beams, offset components are not canceled out. In addition, the calculated scan image will wash out at locations with very low detected light power levels, since the signal-to-noise ratio no longer allows correct and unequivocal allocation of a hue or brightness to the scanned image point.

German Unexamined Application DE 100 33 269.2 A1 discloses an apparatus for coupling light into a confocal scanning microscope whose purpose is to compensate for or eliminate these fluctuations in illuminating light power level. The apparatus for coupling in light comprises an optically active component that serves in particular to select the wavelength and adjust the power level of the incoupled light. The apparatus is characterized in that in order to influence the incoupled light, the component serves as the adjusting element of a control system. A disadvantage of this apparatus is that the beam splitter which separates the illumination beam path from the detection beam path necessarily has a polarization- and wavelength-dependent reflectivity. The control operation as a result is laborious and complex, and necessitates complicated calibration measurements.

In German Unexamined Application DE 197 02 753 A1, it is proposed continuously to monitor the power level of the laser radiation, in particular of each individual laser line, that is coupled into the scanning head, and to compensate for fluctuations directly at the laser or using a downstream intensity modulator (ASOM, AOTF, EOM, shutter). The beam splitter problem already explained is relevant with respect to this disclosure as well.

SUMMARY OF THE INVENTION

It is therefore an object of the present invention to provide a scanning microscope in which the light power level of the sample illuminating light is, in efficient and reliable fashion, largely decoupled from the light power level, the wavelength, and the polarization of the output light proceeding from the light source.

The present invention provides a scanning microscope comprising: an acoustooptical component that splits out illuminating light for illumination of a sample from the output light of at least one light source, and conveys detected light proceeding from the sample to a detector, a control circuit for controlling the power of the illuminating light and at least one monitoring detector which is arranged in the beam path of the output light from which the illuminating light has been split out and which is the measuring element of the control circuit.

The invention has the advantage that illuminating light power level fluctuations, and therefore image artifacts, are largely avoided in efficient fashion. The reduced requirements according to the present invention with regard to the properties of the output light of the light source, in terms of polarization adjustment and constant output light power level, furthermore allow substantially simplified incoupling. In particular, it is possible according to the present invention to transport the output light using light-guiding fibers, which in some circumstances considerably and time-dependently modify the light power level and especially the polarization, largely without influence on the invariability of the illuminating light power level.

In a preferred embodiment, the acoustooptical component splits off the output light in spatially spectral fashion. In this embodiment, one monitoring detector is preferably provided for each of the different wavelength regions or different wavelengths of the spatially spectrally split-off output light, thus making possible wavelength-independent detection.

In a particular embodiment, a processing module is provided that controls the acoustooptical component in open- or closed-loop fashion as a function of at least one light power level measured with the monitoring detector. The acoustooptical component is preferably embodied as an acoustooptical tunable filter (AOTF) or an acoustooptical modulator (AOM). Acoustooptical filters are widely known; German Unexamined Application DE 197 13 254 may be cited here purely by way of example. In acoustooptical filters (AOTFs), a mechanical wave that passes through the AOTF, and at which a light wave can be diffracted or scattered, is generated by way of an acoustic generator (e.g. a piezoelement) that is activated by an electromagnetic control frequency. Ideally, acoustooptical filters are constructed in such a way that only that component of the wavelength corresponding to the control frequency is separated by diffraction from the rest of the incident light. The power level of the diffracted light can be adjusted by appropriate selection of the amplitude of the acoustic wave.

In another embodiment, a processing module is provided that, as a function of at least one light power level measured with the monitoring detector, controls in open- or closed-loop fashion a controllable optical element arranged between the light source and the acoustooptical component in the beam path of the output light of the light source.

In an embodiment, the controllable optical element can be a polarization rotator which, for example, contains an LCD element or a rotatable phase plate, or which contains a bendable light-guiding fiber functioning by birefringence. This embodiment is particularly advantageous when a light-guiding fiber is used to transport the output light, since it is thereby possible to avoid undesired rotations of the polarization direction of the output light that otherwise—since most reflections in the scanning microscope are subject to a polarization-dependent reflectivity—would be converted into fluctuations in the illuminating light power level.

In other embodiments, the controllable optical element is an LCD element and/or an acoustooptical tunable filter (AOTF) and/or an acoustooptical modulator (AOM) and/or an electrooptical modulator (EOM).

In an embodiment, the scanning microscope is a confocal scanning microscope.

BRIEF DESCRIPTION OF THE DRAWINGS

The subject matter of the invention is depicted schematically in the drawings and will be described below with reference to the Figures, identically functioning elements being labeled with the same reference characters. In the drawings.

DETAILED DESCRIPTION OF THE INVENTION

Figure 1:
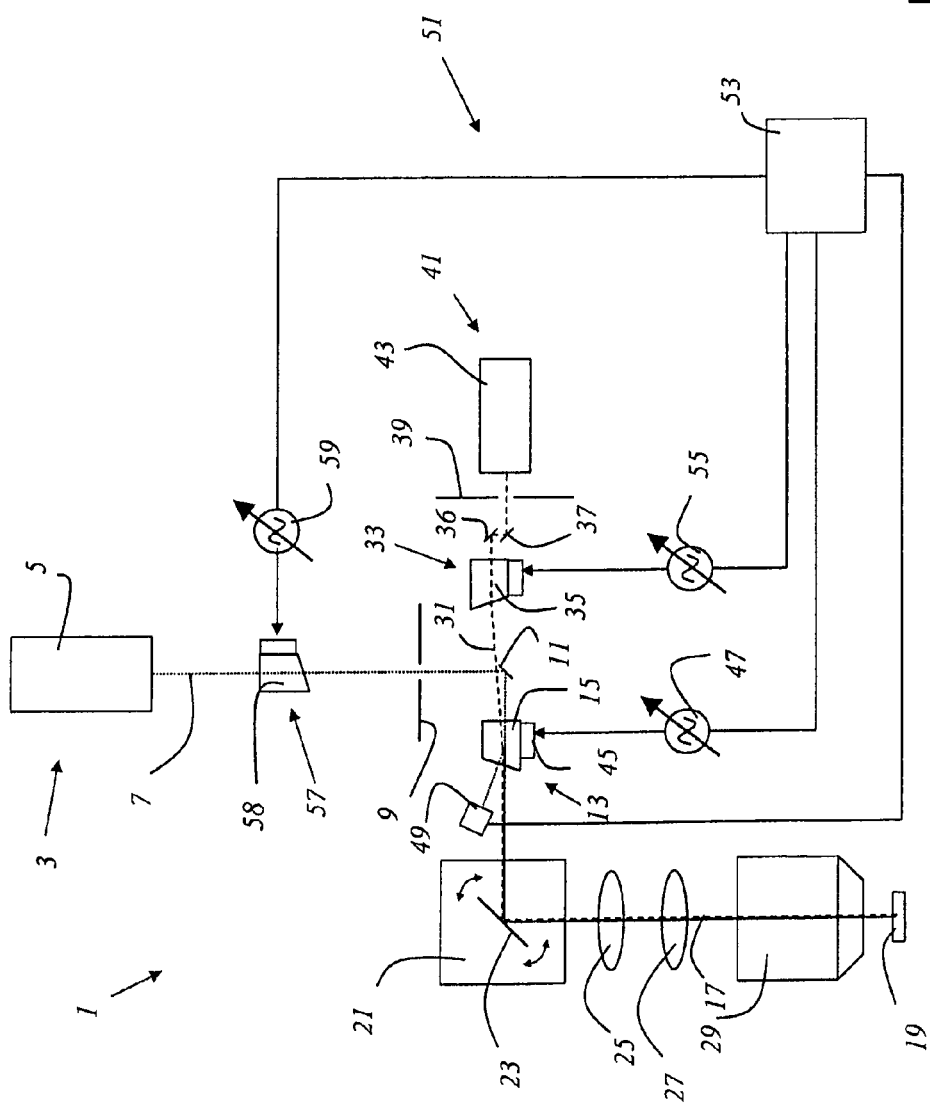
FIG. 1 shows a scanning microscope according to the present invention.

FIG. 1 shows a scanning microscope 1 according to the present invention which is embodied as a confocal scanning microscope. A light source 3, which is embodied as a multiple-line laser 5, emits output light shaped into an output light beam 7. This passes through illumination pinhole 9 and is directed by a deflection mirror 11 to an acoustooptical component 13 that is embodied as AOTF 15, which splits off from output light beam 7 an illuminating light beam 17 for illumination of a sample 19. From acoustooptical component 13, illuminating light beam 17 travels to a beam deflecting device 21, which contains a gimbal-mounted scanning mirror 23 and guides illuminating light beam 17 through scanning optical system 25, tube optical system 27, and objective 29, over or through sample 19. Detected light beam 31 coming from sample 19 passes in the opposite direction through objective 29, tube optical system 27, and scanning optical system 25, and travels via scanning mirror 23 to acoustooptical component 13, which conveys detected light beam 31 via a compensation element 33 that is embodied as a further acoustooptical component 35, via a mirror pair made up of a first mirror 36 and a second mirror 37, and through detection pinhole 39 to a detector 41 that is embodied as multi-band detector 43. The mirror pair serves to bring detected light beam 31 into the desired beam axis, i.e. the beam axis that detected light beam 31 defines upon emergence from beam deflecting device 21. Output light beam 7 is drawn as a dotted line. Illuminating light beam 17 is depicted in the drawings as a solid line, and detected light beam 31 as a dashed line.

Acoustooptical component 13 is embodied as AOTF 15, through which an acoustic wave passes. The acoustic wave is generated by an electrically activated piezoacoustic generator 45. Activation is accomplished by a high-frequency source 47 which generates an electromagnetic high-frequency wave that comprises several adjustable HF frequencies. The HF frequencies are selected in such a way that only those components having the desired wavelengths are split out from output light beam 7 as illuminating light. The other components of output light beam 7 that are not influenced by the acoustic excitation strike a monitoring detector 49 which measures the power level of the remaining output light in wavelength-dependent fashion and is the measuring element of a control circuit 51. Control circuit 51 contains a processing module 53 that receives the measured values of monitoring detector 49 and from them calculates control outputs on the basis of which high-frequency source 47 is controlled, by varying the amplitude of the acoustic wave, in such a way that the power level of illuminating light beam 17 is at the desired value constantly over time. The baseline settings are defined within the control circuit by reference measurements, and stored in a memory element (not shown).

The crystal sectioning and orientation of acoustooptical component 13 are selected so that for an identical incoupling direction, different wavelengths are deflected in the same direction. Compensation element 33 is likewise embodied as an AOTF, and is activated by a further high-frequency source 55 with a further electromagnetic high-frequency wave. The HF frequency of the further electromagnetic high-frequency wave is selected in such a way that those components of detected light beam 31 having the wavelength of illuminating light beam 17 are blocked out.

Processing module 53 furthermore controls, via a third high-frequency source 59, a controllable optical element 57, arranged between light source 3 and acoustooptical component 13, that is likewise embodied as an AOTF 58 and provides coarse adjustment within control circuit 51.

An advantage of the invention is that periodically (or as defined by the user) all the laser lines can be continuously monitored sequentially, e.g. line by line. AOTF 58 that precedes AOTF 15 is used for this purpose. In addition to the laser lines that are currently to be directed to sample 19, using AOTF 58 an additional laser line can be respectively switched into output light beam 7. Each switched-in laser line in output light beam 7 can have a very specific intensity applied to it—e.g. 1% of the 488-nm line, then 5% of the 632-nm line, etc.—depending on the output power level of multiple-line laser 5 and the detector sensitivity of monitoring detector 49. These additional lines, which do not correspond to an HF frequency impinged upon at acoustooptical component 13 that is embodied as AOTF 15, are thus not split out from output light beam 7 as illuminating light, but instead strike monitoring detector 49. There the intensity is converted into an electrical signal that, ideally, should always be the same. In the event of short-term changes in one or more laser lines in output light beam 7, the reflectivity of acoustooptical component 13 is then simply modified for the line or lines, by modifying the amplitude of the associated HF wave or waves, in such a way that the desired light power levels in illuminating light beam 17 always remain constant.

Since an AOTF has a maximum diffraction efficiency of approx. 95%, a small component of the illuminating light always strikes monitoring detector 49 during scanning. This small residual light component causes an offset at the detector, which can be troublesome depending on the laser power level of different laser lines. In this case it is advisable to perform the respective reference measurement at a non-scanning point in time, e.g. before each new image acquisition. For that purpose, the light power levels of the individual laser lines in output light beam 7 are then selected, by appropriate selection of the HF frequencies at AOTF 58, in such a way that a reference measurement using monitoring detector 49 is possible. Suitable control outputs for control purposes are then outputted by processing module 53 into control circuit 51.

It is also conceivable for light power level fluctuations that change slowly over time to occur in excitation light beam 7, for example during the system warm-up phase. In general, the average light power level of some or all of the laser lines in excitation light beam 7 will slowly rise. Using the method described above, in the context of predefined HF values (frequencies and amplitudes) with which AOTF 58 is acted upon in order to perform a coarse adjustment of the light power level, the amplitudes of the corresponding HF values that are applied to AOTF 15 would then be steadily decreased on the basis of control circuit 51 so that the light power levels in illuminating light beam 17 remain constant. The excess light that is not diffracted into the first order then travels via the zero order to monitoring detector 49. It is then advisable to reset the coarse adjustments at AOTF 58 after a certain time so that the amplitudes of the applied HF frequencies at AOTF 15 are initially switched to almost 100%, in order to achieve maximum diffraction of the laser lines into illuminating light beam 17. The method then begins again from the top until an equilibrium has become established, and only minor fluctuations are being compensated for at acoustooptical component 13 by setting a defined reflectivity for each laser line.

Figure 2:
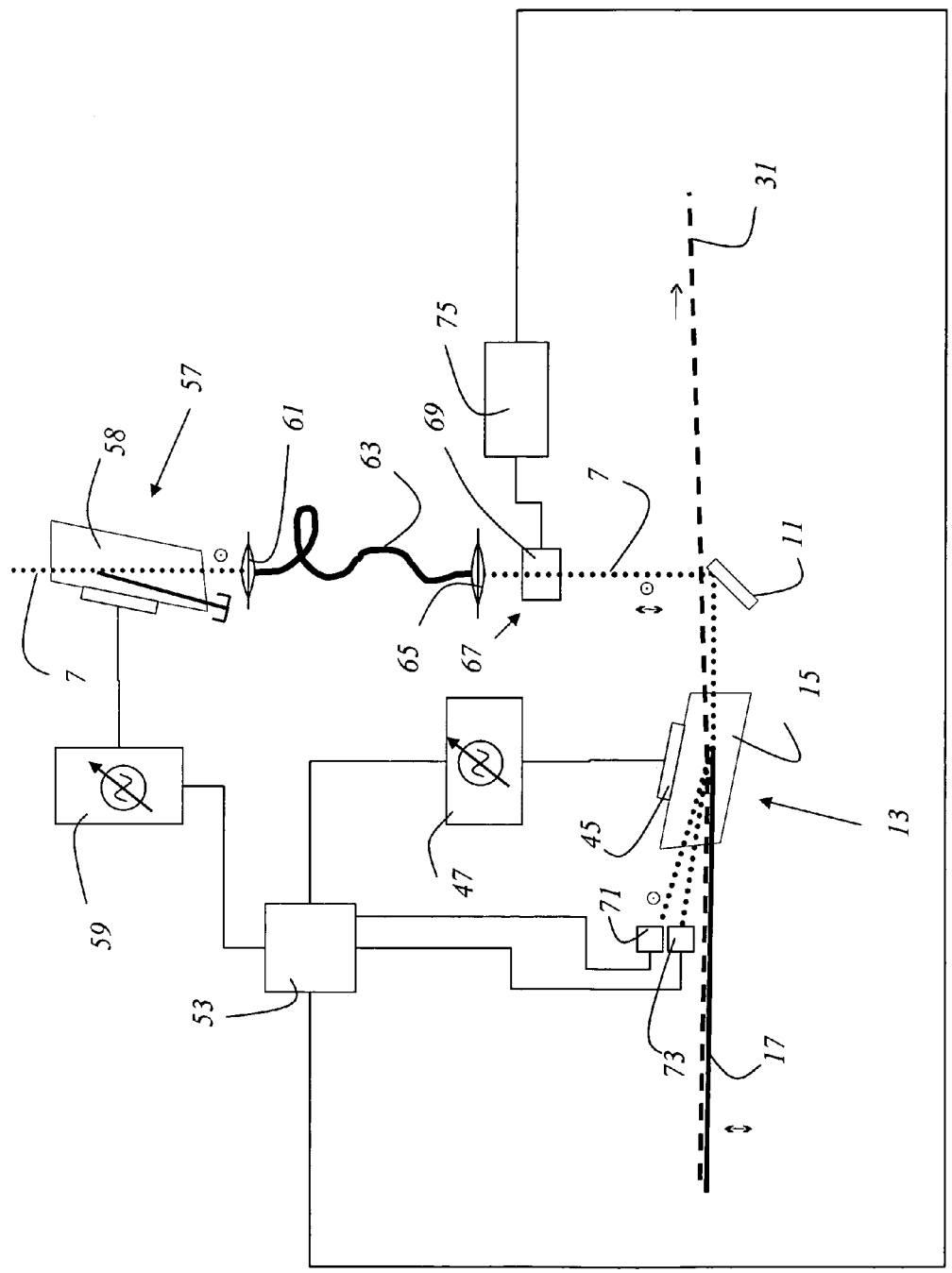
FIG. 2 is a view of a detail of a scanning microscope according to the present invention.

FIG. 2 is a view of a detail of a scanning microscope according to the present invention. Output light beam 7 firstly passes through a controllable optical element 57 that is embodied as an AOTF and serves for coarse adjustment within control circuit 51. It is powered by a third high-frequency source 59. Linearly polarized output light beam 7, which exhibits a sagittal polarization direction, is coupled with incoupling optical system 61 into a light-guiding fiber 63 for transport. After outcoupling by means of outcoupling optical system 65, output light beam 7 passes through a further controllable optical element 67 that is embodied as an LCD polarization rotator 69. The polarization direction of the output light usually rotates while passing through the light-guiding fiber, and the rotation angle can be subject to fluctuations over time. An elliptical polarization is often produced from the initially linear polarization. The portion of the output light that exhibits both tangential polarization and the desired wavelength corresponding to the HF frequency is diffracted into the first order by acoustooptical component 13 that is embodied as AOTF 15, and is conveyed as illuminating light beam 17 to the sample (not shown). The portion having the same wavelength but sagittal polarization is diffracted into the second first diffraction order and is received by a first monitoring detector 71. The remainder of the output light leaves AOTF 15 in the zero diffraction order direction and strikes a second monitoring detector 73. The signals of first monitoring detector 71 and second monitoring detector 73 are directed to a processing module 53 that controls, in open- or closed-loop fashion, high-frequency source 47 of AOTF 15, further high-frequency source 59 of controllable optical element 57, and control module 75 of LCD polarization rotator 69. Since the sum of the light power level at first monitoring detector 71 and at second monitoring detector 73 and that of the illuminating light, minus an amount resulting from system damping (which can be ascertained by a reference measurement), is constant, it is possible to deduce, from the light power levels at first monitoring detector 71 and second monitoring detector 73, the light power level of the illuminating light; that level is held constant over time by control circuit 51. A fluctuation of the output light power level of the light source can also be calculated by the processing module, in particular by comparing the measured light power levels at first monitoring detector 71 and at second monitoring detector 73, and accounted for by control action.

The invention has been described with reference to a particular embodiment. It is self-evident, however, that changes and modifications can be made without thereby leaving the range of protection of the claims below.

What is claimed is:

1. A scanning microscope comprising: an acoustooptical component that splits out illuminating light for illumination of a sample from output light of at least one light source, and conveys detected light proceeding from the sample to a detector, a control circuit for controlling the power of the illuminating light and at least one monitoring detector which is arranged in a beam path of the output light from which the illuminating light has been split out and which is a measuring element of the control circuit.

2. The scanning microscope as defined in claim 1, wherein the acoustooptical component spreads off the output light in spatially spectral fashion.

3. The scanning microscope as defined in claim 2, wherein one monitoring detector is provided for each of different wavelength regions or different wavelengths of the spatially spectrally spread-off output light.

4. The scanning microscope as defined in claim 1, further comprising a processing module that controls the acoustooptical component in open- or closed-loop fashion as a function of at least one light power level measured with the monitoring detector.

5. The scanning microscope as defined in claim 1, wherein the acoustooptical component is an acoustooptical tunable filter (AOTF) or an acoustooptical modulator (AOM).

6. A scanning microscope comprising: an acoustooptical component that splits output light of at least one light source into at least illuminating light for illumination of a sample and monitoring light, a control circuit for controlling the power of the illuminating light, at least one monitoring detector which is arranged in a beam path of the monitoring light and which is a measuring element of the control circuit, and a processing module that controls the acoustooptical component in open-loop or closed-loop fashion as a function of at least one light power level measured with the monitoring detector.

7. A scanning microscope comprising: an acoustooptical component that splits out illuminating light for illumination of a sample from output light of at least one light source, and conveys detected light proceeding from the sample to a detector, a control circuit for controlling the power of the illuminating light, at least one monitoring detector which is arranged in the beam path of the output light from which the illuminating light has been split out and which is a measuring element of the control circuit, and a processing module that, as a function of at least one light power level measured with the monitoring detector, controls in open- or closed-loop fashion a controllable optical element arranged between the light source and the acoustooptical component in the beam path of the output light of the light source.

8. The scanning microscope as defined in claim 7, wherein the controllable optical element is a polarization rotator and/or an LCD element and/or an acoustooptical tunable filter (AOTF) and/or an acoustooptical modulator (AOM) and/or an electrooptical modulator (EOM).

9. The scanning microscope as defined in claim 7, wherein the acoustooptical component spreads off the output light in spatially spectral fashion.

10. The scanning microscope as defined in claim 9, wherein one monitoring detector is provided for each of different wavelength regions or different wavelengths of the spatially spectrally spread-off output light.

11. The scanning microscope as defined in claim 7, further comprising a processing module that controls the acoustooptical component in open- or closed-loop fashion as a function of at least one light power level measured with the monitoring detector.

12. The scanning microscope as defined in claim 7, wherein the acoustooptical component is an acoustooptical tunable filter (AOTF) or an acoustooptical modulator (AOM).

* * * * *